United States Patent [19]
Osmond et al.

[11] Patent Number: 6,003,047
[45] Date of Patent: *Dec. 14, 1999

[54] NON-HIERARCHICAL APPLICATION INTERFACE FOR HTML-BASED NETWORK STORAGE MANAGEMENT PROGRAMS

[75] Inventors: Roger F. Osmond, Littleton; Uday Gupta, Westford, both of Mass.

[73] Assignee: EMC Corporation, Hopkinton, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,034

[22] Filed: Dec. 30, 1996

[51] Int. Cl.$^6$ ........................................ G06F 17/40
[52] U.S. Cl. ............................ 707/513; 345/333
[58] Field of Search .................... 707/501, 505, 707/513, 514, 4, 10, 104; 345/329, 333, 335, 339; 395/200.3, 200.33, 200.34, 200.35, 200.36, 200.47, 682, 683, 684

[56] References Cited

U.S. PATENT DOCUMENTS

| | | | |
|---|---|---|---|
| 5,623,589 | 4/1997 | Needham et al. | 345/356 |
| 5,706,507 | 1/1998 | Schloss | 707/104 |
| 5,715,444 | 2/1998 | Danish et al. | 707/4 |
| 5,734,831 | 3/1998 | Sanders | 395/200.53 |
| 5,742,762 | 4/1998 | Scholl et al. | 395/200.3 |
| 5,742,768 | 4/1998 | Gennaro et al. | 395/200.33 |
| 5,745,681 | 4/1998 | Levine et al. | 395/200.3 |
| 5,748,188 | 5/1998 | Hu et al. | 345/326 |
| 5,748,896 | 5/1998 | Daly et al. | 395/200.53 |

OTHER PUBLICATIONS

Netscape 2.0, http://home.netscape.com/eng/mozilla/2.0/relnotes/windows–2.0.html, 1998, pp. 1–3.
Lavapuro, "Mozilla 2.0a Release Notes", BrowserWatch, http://browserwatch.internet.com/news/story/netscape29.html, Sep. 15, 1995, pp. 1–2.

*Primary Examiner*—Stephen S. Hong
*Attorney, Agent, or Firm*—John M. Gunther, Esq.; Krishnendu Gupta, Esq.

[57] ABSTRACT

A method and apparatus for managing a network attached storage system is presented which includes a web based user interface. The interface allows for the execution of many different commands on several different storage system attributes without loss of context between command execution. The interface is HTML based and provides dynamic construction of Javascript object lists based on a database read by a CGI program executing on an HTTP server. The interface eliminates the hierarchical structure of menu navigation associated with other interfaces.

5 Claims, 5 Drawing Sheets

NON-HIERARCHICAL APPLICATION INTERFACE FOR HTML-BASED NETWORK STORAGE MANAGEMENT PROGRAMS

BACKGROUND OF THE INVENTION

This invention relates generally to interfaces typically associated with network computer program applications and more particularly to providing an internet or intranet based monitoring and management system for storage systems using a so called web browser interface.

Older interfaces associated with application programs generally followed the so called "navigation by menu" model where a menu typically includes a list of selectable commands or objects which are of interest to the user. An object of one menu list may actually be another menu with an associated list of objects (or commands). In the "navigation by menu" model, menus are arranged in a command-oriented tree. As such, the user is forced to navigate through a branching hierarchy of menus until the desired menu or object is found. An undesirable result of the above described model is the loss of context between menus. After navigating through several menus to reach a desired object, the user may not be able to determine from the on screen display, the effects of selecting the found object. Thus the user is forced to remember the context of the menus navigated through to ensure a desired result.

Newer graphical interfaces may employ a so called object-centric model. In the object-centric model, the user interface includes objects, i.e. graphical representations of objects. Associated with each object is a context in which a user may find the means (e.g. commands, etc.) to complete an intended operation. Also, within a particular context, a user may be presented with additional objects. Even with such an arrangement, some prior art interfaces with an object-centric look, will merely mimic the behavior of a character terminal interface. Better object-centric interfaces may allow execution of a given command on several objects, but still require the user to traverse a menu hierarchy to execute different commands on the chosen object(s).

As is known in the art, one type of interface by which a user may access information over the internet or an intranet is a so called web browser. A web browser typically provides a graphical interface and allows a user to navigate or "browse" the internet using a hypertext information and communication system (i.e. the world wide web). One such well known browser is the Netscape browser developed by Netscape Communications Corporation. Thus, any computer with a network connection to the internet may potentially be accessed by a user with a computer also connected to the internet and running a web browser.

One of the shortcomings of many web based applications is the loss of context while navigating through various paths of information as described above. This is a result of the interface design which requires the user to "link" or "jump of" to different pages of information in order to navigate and access various information. The link process is typically performed by the user activating, with a mouse or other interface device, a defined hot spot on the web page (which is displayed on the interface). As is generally the case, linking to a new page causes the loss of most, if not all, of the information on the page linked from. Thus, there can be a loss of context for the user which may create confusion since the user is required to remember all the information in the previous pages which the user traversed to reach the current point.

As is also known in the art computer systems generally include a central processing unit, a memory subsystem, and a storage subsystem. According to a networked or enterprise model of a computer system the storage subsystem associated with or in addition to a local computer system may include a large number of independent storage devices or disks housed in a single enclosure. This array of storage devices is typically connected to several computers over a network. Such a model allows for the centralization of data which is to be shared among many users and also allows a single point of maintenance for the storage functions associated with computer systems.

It is desirable for users (e.g. MIS professionals) of the above described storage systems to be able to configure and monitor the storage devices and data movement controllers associated with the storage system. Previously, such management was achieved using a command line interface from a host computer attached to the storage system. With such a method, the manager would be able to inquire about the status of various aspects of the storage system and make configurations changes using specialized commands typed in at the managers console or terminal.

Recently, graphical user interfaces have been developed to ease the tasks of monitoring and configuring storage systems. These graphical user interfaces are essentially another layer of programming which replaces the command line interface and thus still require that a management program be run on at least one of the host systems attached to the storage system and thereby require that the system manager log onto or be physically located at a particular host computer or terminal.

It would be advantageous to provide a network storage management solution which allowed a system manger to remotely monitor and configure a storage system via the internet or an intranet. It would further be advantageous to provide a storage management solution which allows the use of commercially available web browsers to perform the management tasks without the navigation typically associated with browsers. Since browsers operate on (i.e. interpret) web pages in order to provide the user with an interface to the information on the internet, the interface is limited by the functionality provided by the hyper text markup language (HTML) used to create the web pages. Since HTML is not a programming language (e.g. like "C" or "C++") providing a web based storage management system with all the same features as a traditional storage management application, has, prior to the present invention, not been accomplished.

SUMMARY OF THE INVENTION

In accordance with the present invention, a method of providing a user interface is provided which eliminates the loss of context associated with navigating through a hierarchical menu interface. Them method includes presenting a user with a frame based graphical user interface. The frames segment a display real estate into various sections. The main section includes the context area where context selections are made. In the preferred embodiment, the context selections are those items or objects associated with a network attached storage device which may be monitored or controlled. The context frame of the interface remains constant with respect to the selectable choices. The selection of a particular context causes a commands frame to be loaded with the selectable commands available for the selected context. Once a user selects a command then an arguments frame loads with those arguments corresponding to the selected command. The user may execute the various commands by selecting the command objects in the command frame portion of the interface. Regardless of the command chosen, the context frame remains constant. As such, the menu navigation associated with most interfaces is eliminated and a user does not need to navigate up and down menus, losing context, to perform the tasks defined by the context and commands. Additionally, the commands frame (i.e. the objects presented in the frame) remain constant until a context change is made by the user. With such an arrangement, a user is presented with a much more manageable interface which allows a user to perform associated tasks within a chosen context without ever losing visibility of that context.

BRIEF DESCRIPTION OF THE DRAWINGS

The above and further advantages of the present invention may be better understood by referring to the following description taken in conjunction with the accompanying drawings in which.

DETAILED DESCRIPTION OF THE PREFERRED EMBODIMENT

Figure 1:
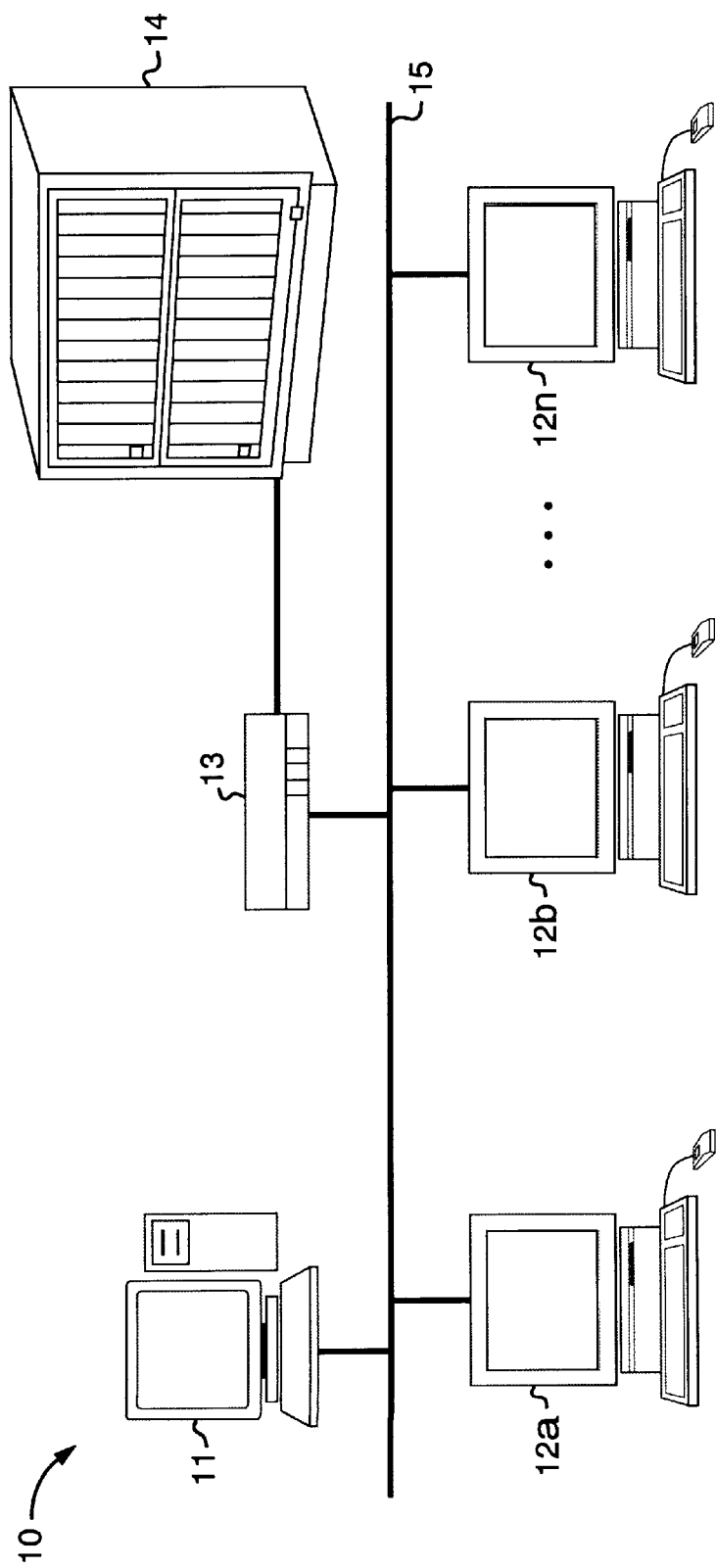
FIG. 1 is a diagrammatic representation of a computer network including networked storage.

Referring now to FIG. 1 network computer system 10 is shown to include, inter alia, computers 11 and 12a through 12n coupled to server 13 via network or bus 15. Computers 11 and 12a through 12n may be any one of several well known types of computers such as personal computers or workstations. Server 13 is further coupled to storage system 14 thereby providing a link between individual computers 11 and 12a through 12n to storage system 14 via server 13. Like many network computer systems, server 13 typically provides the scheduling and routing of data between any of the individual computers 11 and 12a–n and disk storage system 14 as well as between the individual computers 11 and 12a–n themselves. Although not shown, storage system 14 may also be connected to several servers similar to server 13 and thereby service several other network computer systems. Additionally, storage system 14 may be coupled directly to one or more individual computer systems such as mainframe computer systems rather than being connected to several computers through a server such as server 13. Also network 15 may be any network of devices and connections which provide a data communications system.

According to a preferred embodiment of the present invention, each of the computer systems 11 and 12a–12n, in order to take advantage of the non-hierarchical interface of the storage management system of the present invention, should be capable of running any one of the well known web clients (i.e. browsers or similar such applications) such as the Netscape browser from Netscape Communications, Corp. As is generally known, the web clients allow for computers coupled to the same network to communicate using the hyper text transfer protocol (HTTP) information and communication system. As is also known, web clients are typically useful for accessing information stored on various computers distributed about and connected to a network.

Web clients or browsers are application programs that run on a local computer and operate by displaying, in a graphical format, information obtained from servers via HTTP. The fields obtained from the servers may contain information in any one of several well known formats such as HTML, Java, JavaScript, etc. The display is present based on reading and interpreting the accessed information and displaying the results in a window of the web client application.

According to the present invention, a non-hierarchical interface useful with web clients is provided. The interface of the present invention will be discussed with relation to a storage management application. It will be appreciated by those of skill in the art that the interface model of the present invention may be used for a wide range of applications and thus the web-based storage management embodiment described herein should not be seen as a limitation of the present invention. For example, the interface model of the present invention may well be useful for such stand alone applications as word processors, spreadsheets, CAD/CAM, etc.

Figure 2:
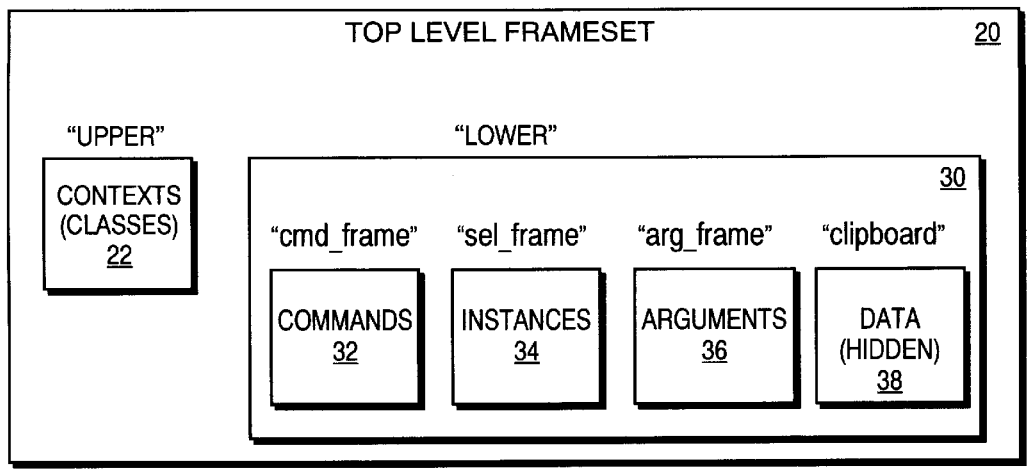
FIG. 2 is a block diagram representation of the interface aspects associated with the present invention.

When utilizing HTML, an interface is generally constructed of subwindows called frames. Frames are used to divide the screen real estate of the browser into multiple areas. A frame is a separate window object. A frameset then, is an HTML document body which includes only frames and other framesets. Referring now to FIG. 2, block diagram representation of the frameset structure of the present invention is shown to include a top level frameset 20. Contained within top level frameset 20 are the upper frame 22 lower framesets 30. As shown, the upper frame is the context frame while the lower frameset 30 includes command frame 32, instances frame 34, arguments frame 36 and data frame 38. It should be understood that FIG. 2 is intended to show the conceptual relationships between frames and framesets and not physical layout or dependencies. As will be described below, each of the frames in frameset 20 may include selectable objects for performing various functions.

Figure 3:
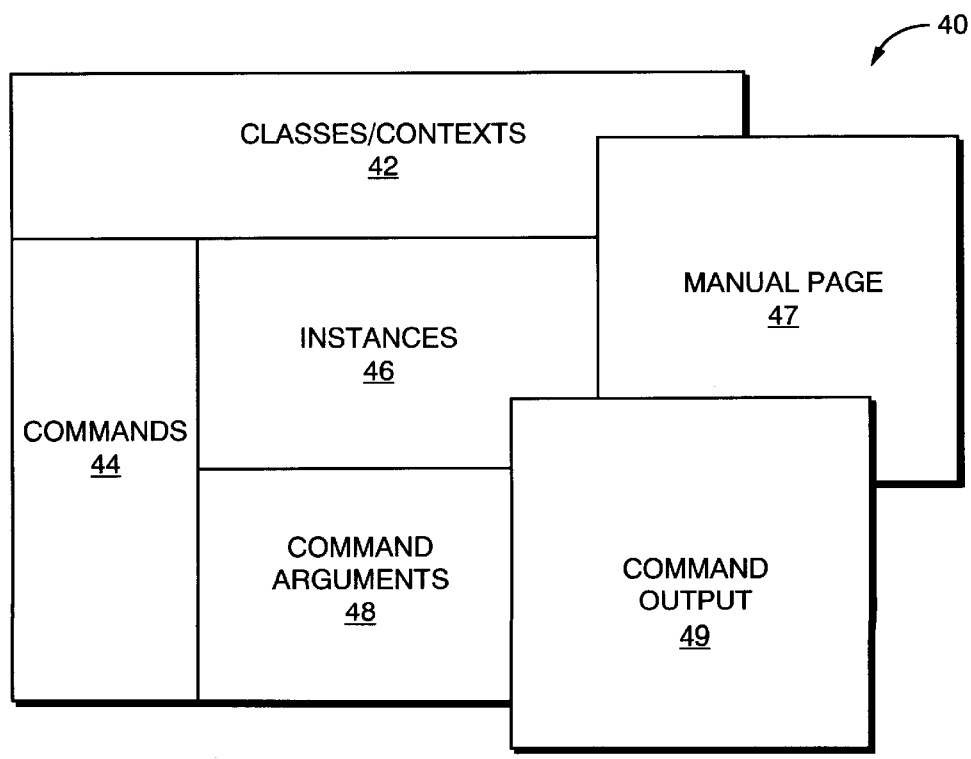
FIG. 3 is a block diagram of the interface layout for a preferred embodiment of the present invention.

Referring now to FIG. 3, a basic diagram of the preferred embodiment of the non-hierarchical interface 40 of the present invention is shown to be arranged such that the contexts frame 42 extends horizontally across the top of the display window with the lower frames 44, 46 and 48 are arranged in horizontal and vertical orientations in relation to the contexts frame 42 and to each other. Each of the frames 42, 44, 46, and 48 are preferably contained within the boarders of the browser application. Conversely, manual or help frame 47 and command output frame 49 which are, in concept, part of the lower frameset 30 (FIG. 2) would preferably appear on the interface as separate windows (i.e. outside the confines of the browser application window).

Figure 4:
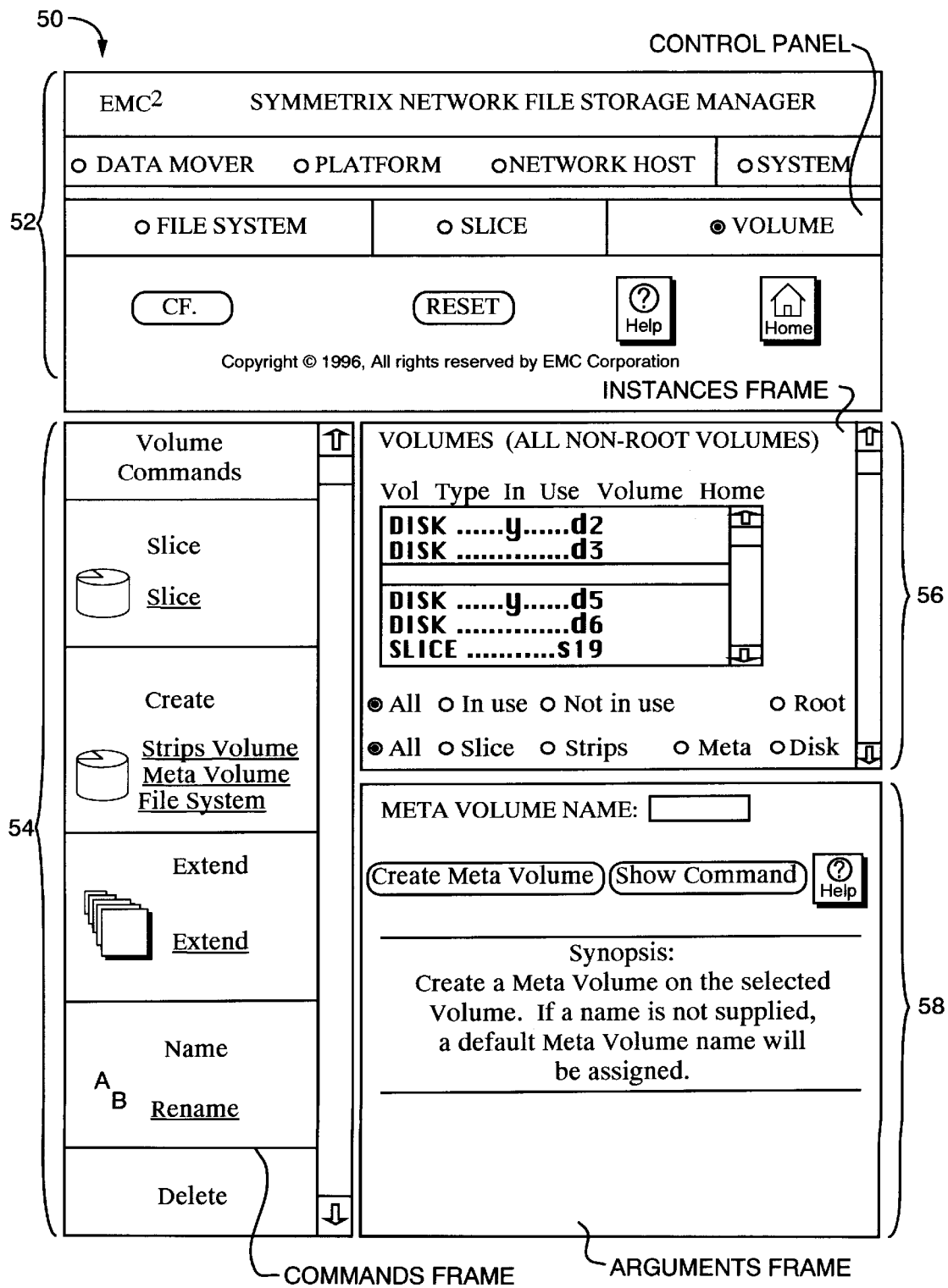
FIG. 4 is a detailed diagram of the interface for a preferred embodiment of the present invention.

Referring now to FIG. 4 and according to a preferred embodiment of the present invention, graphical user interface (GUI) 50 is shown to include several frames 52–58 each containing various pieces of information and control features. In particular, frame 52 is the so called control panel or context frame and controls the contents (or choices of context) of remaining frames 54, 56 and 58. Each of the selections in context frame 52 defines a class of objects. Frames 52, 54, 56, and 58 of FIG. 4 correspond to frames 42, 44, 46, and 48 of FIG. 3. That is, frame 52 is the context frame, frame 54, 56, and 58 are the commands frame, instances frame, and arguments frame respectively.

Here, graphical user interface 50 is configured to provide monitoring and control of various elements of a mass storage system such as the storage system 14 of FIG. 1. Thus, in the preferred embodiment, the classes of objects defined by context frame 52 are "Data Mover", "Platform", "Network Host", "System", "File System", "Slice", and "Volume". The contexts frame 52, remains constant within the interface except for context selection changes made by the user. The commands frame 54 presents to the user, only those commands available within a chosen context (e.g. the Platform context) as dictated by the radio buttons activated in the context frame 52. Although context selections are made here using radio buttons, the interface may include any type of object which allows for user input selection. Thus the use of radio buttons should not be seen as a limitation of the present invention.

In general, the contents (i.e. the objects associated with the chosen context) of commands frame 54 remains constant within a particular chosen context and will not change unless the context is changed in context frame 52. The contents of the instances frame 56, like the commands frame 54, is context dependent. The instances frame includes a display of those instances of objects available in the object class chosen in the context frame 52. For example, in FIG. 4, the "Volume" context has been chosen indicating a desire to access the "Volume" class of objects. Thus, in frame 56 the instances of "Volume" objects, here the list of disk volumes, are displayed when a the "Volume" context is chosen in context frame 52. It should be understood that there is a stateless relationship between the instances frame 56 and the commands frame 54. That is, a selection of any object in either of the frames 54 or 56 does not alter or effect the appearance or meaning of the other. Thus, an MxN array of command/instance combination may be made using interface 50 without ever incuring a context change.

The contents of the arguments frame 58, is dependent upon a selection made in the commands frame 54 and is regenerated anytime a new command within a particular context is selected in commands frame 54.

In order to use the graphical user interface 50, a user would invoke a web browser on the associated client system, such as any one of computers 11 or 12a through 12n of FIG. 1. Once the web client is invoked the user would use the addressing capabilities of their web client to access the location of the web page associated with the network file storage manager. Once the address is entered into the web client, the web client reads and interpret the HTML based web page and display a shell of the interface which would include, at a minimum frame 52. Frames 54–58 would typically remain blank until a context selection was made in frame 52.

As stated above, context frame 52 generally defines the contents of remaining frames 54–58 and is done by selecting any one, or valid combination, of selections using the radio button selection as shown. Again, any object or widget which allows for user input could be used in place of the radio buttons described here. According to the preferred embodiment, to establish an operating context, the user selects one or more classes in frame 52 using the radio buttons. It should be understood that the contexts frame 52 includes an HTML form element which further includes radio buttons for various controllable aspects of storage system 14 (FIG. 1), for example: Data Mover (e.g. file server), Platform (e.g. file server as computer), Network Host (e.g. file server as a network resident device), File System, Volume, and System. In accordance with the preferred embodiment, these selectable items are those items which would be capable of being monitored or controlled for the storage system 14 (FIG. 1) and would be of interest to an MIS professional who had responsibility for management of the storage system. In addition to making individual selections, a user may also select certain combinations of context such as, for example, Data Mover and File System.

Choosing a context in frame 52 causes the lower frameset, i.e. frames 52, 54, and 56 to be loaded with the information or objects relevant to the chosen context. The entire interface is built through a sequence of operations as shown in flowchart 100 of FIG. 5. At step 101, an event occurs in the context frame (window). This event is the selection of one or more of the available context radio buttons and activating the OK button as shown in frame 52 (FIG. 4). At step 102, the validity of the chosen context (e.g. if a combination is chosen) is checked to see if that chosen context is available. If the chosen context is not available, the user is notified via a message displayed in a pop-up message window (not shown) as indicated in step 103. If the selection is valid, the top level HTML document associated with the frameset 20 (FIG. 2) sets, at step 104, the lower frame document resource locator (URL) address to that of the chosen context frameset. This causes the context frameset to be loaded. Once the lower frameset is loaded, the context frameset, at step 105, requests that the data frame document URL (hidden frame) be set to the output of a CGI program. The CGI program is used to read a database containing the information about objects associated with each selectable context. According to a preferred embodiment of the present invention, the database read by the CGI program is a collection of so called flat files which resides on the storage system 14 (FIG. 1). The database could however be any collection of information useful in creating an interface. Here, the records in the database include colon separated fields. Some fields contained in the database are references (pointers) to objects of other types and may also trigger access to other files. The records are used to construct so called Javascript objects or arrays of Javascript objects. The objects, for the preferred embodiment, are Javascript representations of the Data Mover, File System, Volume, Slice and Disk objects.

Receipt of the request for the data frame document URL (hidden frame) to be set to the output of a CGI program, when received by the HTTP server, causes at step 106, invocation of the CGI program. At step 107, the CGI program (i.e. database reader) opens and reads the database files. At step 108, the CGI program produces as an output, an HTML/Javascript document containing source code to create the list of objects for the chosen context. The output of the CGI program is rerouted by the HTTP server, at step 109, to the requesting client. Here the requesting client is the web browser application, and more particularly the clipboard of the context frameset. As described above, the clipboard is a hidden frame of the context frameset. It is used as just described to receive the source code output generated by the CGI program running on the HTTP server.

Once the clipboard is loaded, at step 110, the clipboard invokes the object list generation functions defined by the received source code (i.e. interprets the received source code) and builds the proper object lists in Javascript format. After the object lists are built, the clipboard then requests, at step 111, that the command frame document URL be set to the command frame page associated with the chosen context. At step 112, once the command frame page is loaded, it generates from the objects created in the clipboard frame, a visible list of objects and control widgets in the selection frame 56 (FIG. 4). At this point, the clipboard contents are not lost and are in fact used to regenerate the visible lists in the selection frame based on selections made by the user in the command frame. The contents of the clipboard would be lost only if a context change were made by the user selecting a new context in the context frame 52 (FIG. 4).

Figure 5:
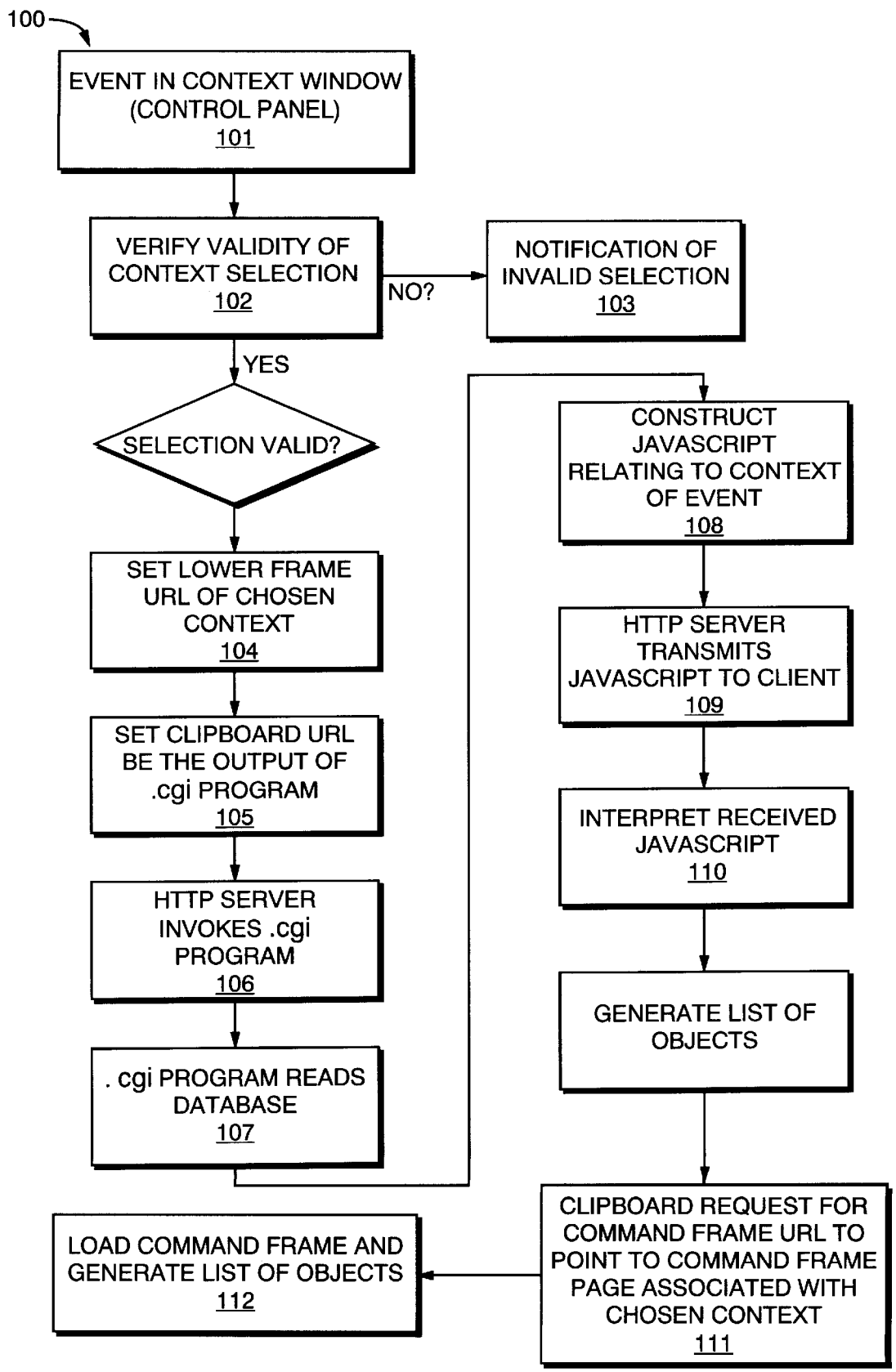
FIG. 5 is a flowchart showing the sequence of operations for building the interface of the preferred embodiment of the present invention.
Figure 6:
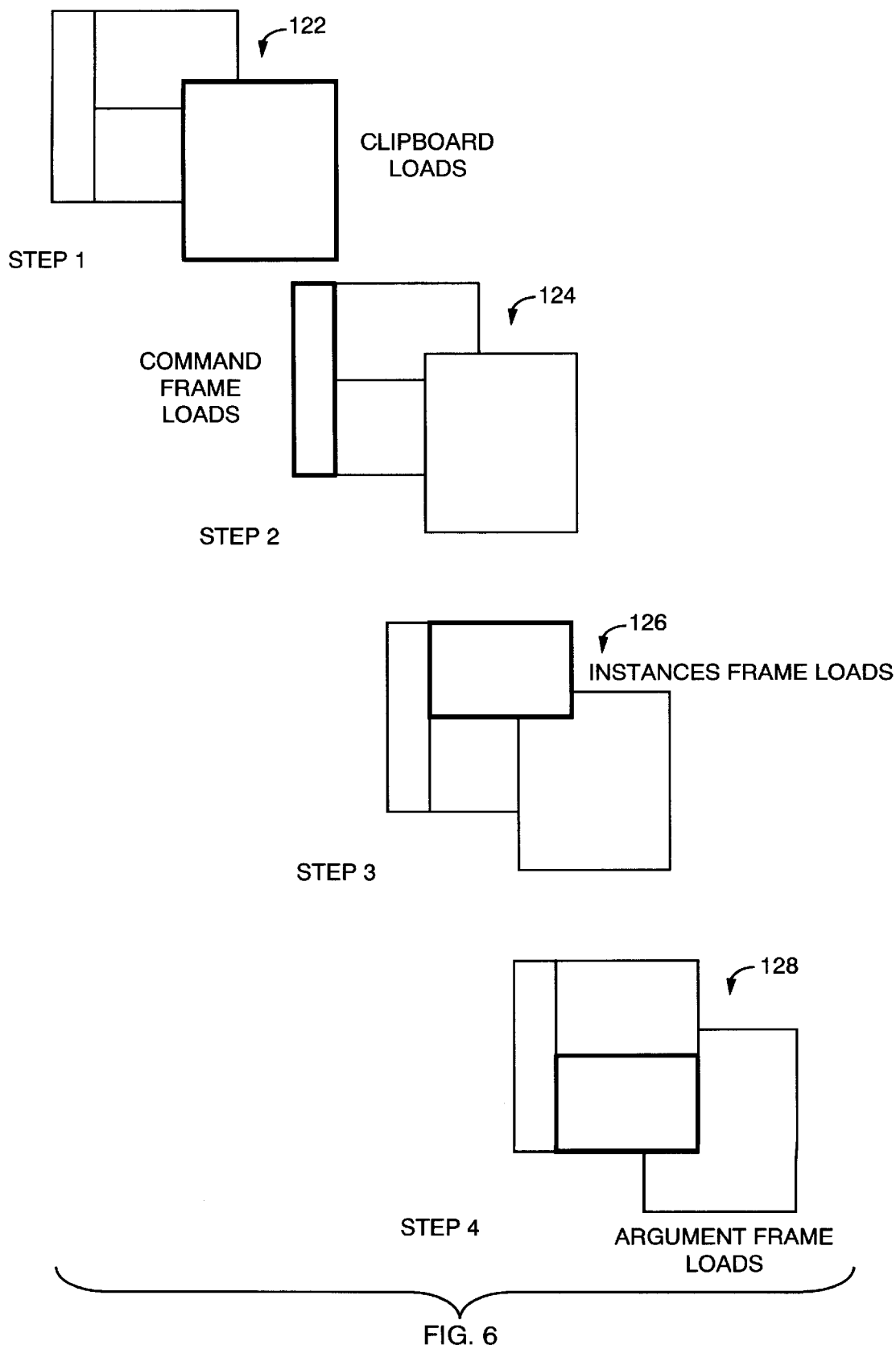
FIG. 6 is block diagram showing the sequence of operations associated with the construction of the interface of the preferred embodiment of the present invention.

Referring now to FIG. 5, an illustration of the sequence of frame loading for the interface of FIG. 4 is shown. As described above, at step one 122, the clipboard document is loaded from the CGI program running on the HTTP server. Remember, that the clipboard is not visible to the user. Once the clipboard loads, at step two 124 the web client interprets the clipboard contents and loads the command frame. After that, at step three 126 the instances frame is loaded according to the clipboard contents. After the instances frame is loaded, the interface doesn't change until the activated by the user selecting a particular command object from the command frame. Once a command is selected, then at step four 128 the arguments frame will be loaded with the arguments appropriate for the selected command.

According to the preferred embodiment, and referring back to FIG. 4, once interface 50 is displayed, the user would decide which attributes of the system being managed they would like to monitor or configure. For example, on the interface shown in FIG. 4 the user may select the volume context in order to monitor and control all the volumes of storage system 14 (FIG. 1). Once the volume radio button was selected the user would then activate the O.K. button of the interface which would cause a display of all of those items or objects associated with controlling and monitoring the volume of storage system 14 to be displayed in frame 54. Once the command frame was created, a select or instances frame 56 is created which displays all of those selectable objects related to the volumes of storage system 14. Once frames 54 and 56 have been displayed the user would then activate one of the command objects (commands) under the commands frame 54 which would further cause the arguments frame 58 to be created and displayed. Since there are different arguments associated with each of the commands selectable from the command frame, the arguments frame 58 is not filled in until a command is selected from the command frame.

It should be noted that once a user has selected a particular context, shown in FIG. 4 as the "Volume" context, by activating the associated radio button of the control panel, there is no requirement for the user to traverse through several links (or pages) as would be done with a traditional HTML based interface . Thus access to commands for controlling and monitoring the objects which are members of the context class chosen in the control panel are always available for that context without losing visibility of that context. That is, as described above, prior art systems would require a user who wished to select, for example, the slice command from the commands frame to select the slice by activating a link which would cause the entire contents of the interface to change, losing visibility to those other items such as items associated with create, extend, name, etc. Since the User is not required to hyperlink through several pages in a forward and backward directional relationship the user never loses the originally chosen context and is more easily to manage and monitor the items associated with that context.

Having described a preferred embodiment of the present invention it will now become apparent to those of skill in the art that other embodiments incorporating its concepts may be provided. It is felt therefore, that this invention should not be limited to the disclosed embodiment but rather should be limited only by the spirit and scope of the appended claims.

What is claimed is:

1. A method of monitoring and controlling resources connected to a computer system comprising the steps of:

providing a communications path between said resources and said computer system;

presenting, to a user at said computer system, a non-hierarchical graphical user interface including selectable classes of objects representing classes of controllable aspects of said resources, a plurality of selectable commands associated with said selectable objects, a plurality of selectable instances of said selectable classes of objects;

allowing said user to select at least one of said selectable classes of objects;

upon selection of one or more of said selectable classes objects, identifying to said user, while maintaining visibility and selectability of said selectable classes of objects, said plurality of selectable commands associated with said selected objects and said selectable instances of said selected class of objects;

enabling said user to select one or more of said selectable commands while maintaining visibility and selectability of said selectable classes of objects, said selectable commands associated with said selected objects, and said selectable instances of said selected class of objects;

enabling said user to select one or more of said selectable instances of said selectable classes of objects while maintaining visibility and selectability of said selectable classes of objects, said selectable commands associated with said selected objects, and said selectable instances of said selected class of objects.

2. The method of claim 1 further comprising the steps of:

after selection of one or more of said selectable commands, presenting to said user, a plurality of selectable arguments while maintaining visibility and selectability of said selectable classes of objects, said selectable commands associated with said selected objects, and said selectable instances of said selected class of objects, said arguments being inputs to said selected commands;

after selection of one or more of said plurality of arguments, executing said command; and displaying results of said command execution while maintaining visibility and selectability of said selectable classes of objects, said selectable commands associated with said selected objects, and said selectable instances of said selected class of objects.

3. The method of claim 1 wherein said selection of said objects further includes the steps of:

verifying validity of said object selection invoking a server application on a remote server, said server application further performing the steps of:

reading a database to construct a script program, said script program corresponding to operations to be performed by said computer system to display said commands;

transmitting said script program to said computer system;

interpreting said script program by said computer system.

4. A storage management system for monitoring and controlling storage resources coupled to a computer network, comprising:

a computer coupled to said computer network and enabled to communicate with said storage resources;

a client application resident in a memory of said computer, said client application operable to display a graphical user interface, said user interface further including:
a plurality of framesets for producing a plurality of displayable frames, said frames remaining at all times visible, active and selectable;
said displayable frames including:
a context frame having a plurality of selectable classes of objects associated with controllable aspects of said storage resources, said classes of objects of said context frame remaining, at all times, visible, active and selectable;
an instances frame responsive to selection of one of said classes of objects for displaying any instances of objects corresponding to said selected class of objects, said instances of objects remaining visible, active and selectable until a selection change is made in said context frame;
a commands frame responsive to selection of one or more of said selectable classes of objects for displaying a plurality of selectable commands, said commands defining operations which may be performed on said instances of object resources, said displayed commands remaining visible, active and selectable until a new selection is made in said context frame;
an arguments frame responsive to selection of one or more of said commands for displaying a plurality of arguments associated with said commands, said arguments remaining visible, active and selectable until a new selection is made in said command frame.

5. The storage management system of claim 4 wherein said client application is responsive to said selection of said one of more classes of objects for invoking a server application, said server application operable to read a database file resident on said server to construct a script relating to operations to be performed by said client application to create said displayable frames, said server application transmitting said constructed script to said client application.

* * * * *